Dec. 11, 1956  W. A. HOLT  2,773,269
ROLL-A-WAY BED
Filed Jan. 26, 1954  3 Sheets-Sheet 1
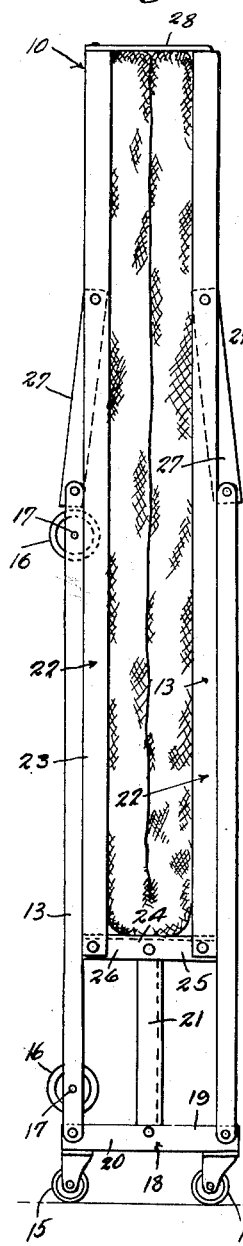
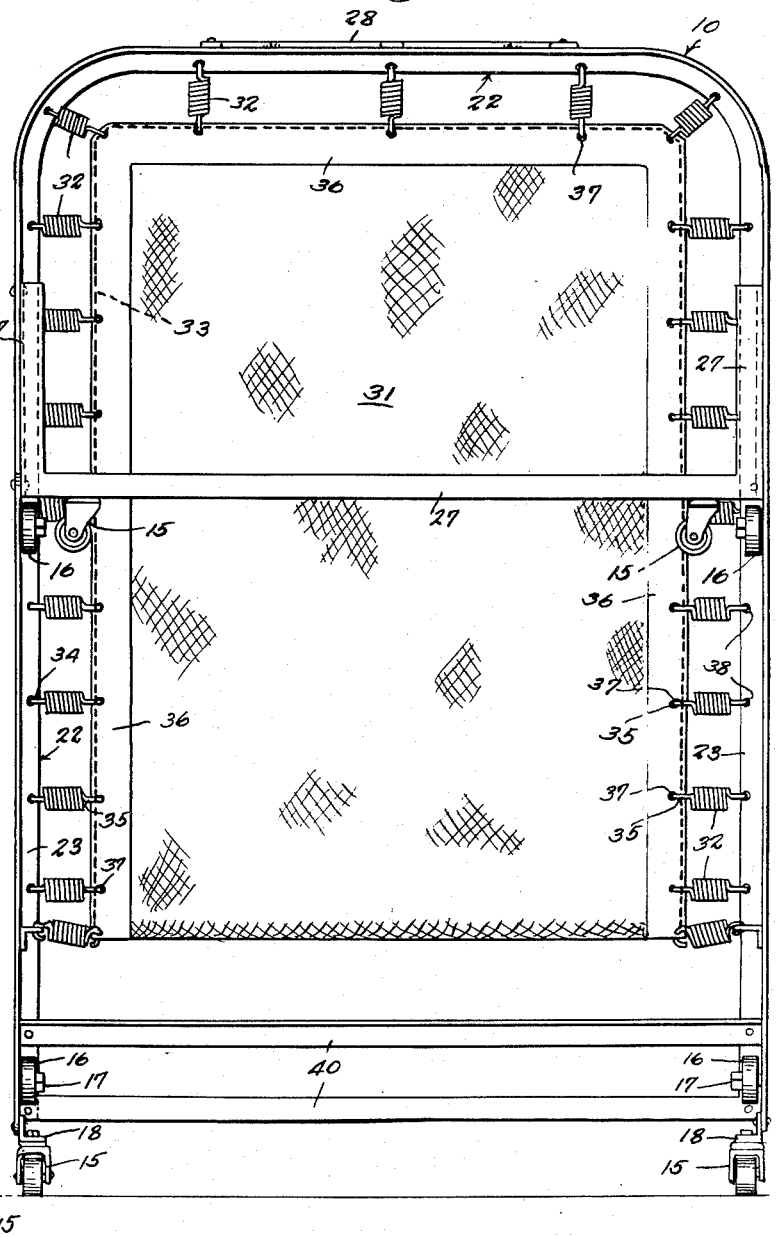
W. A. Holt
INVENTOR
BY Charnow & Leo.
ATTORNEYS.

Dec. 11, 1956
W. A. HOLT
2,773,269
ROLL-A-WAY BED
Filed Jan. 26, 1954
3 Sheets-Sheet 2
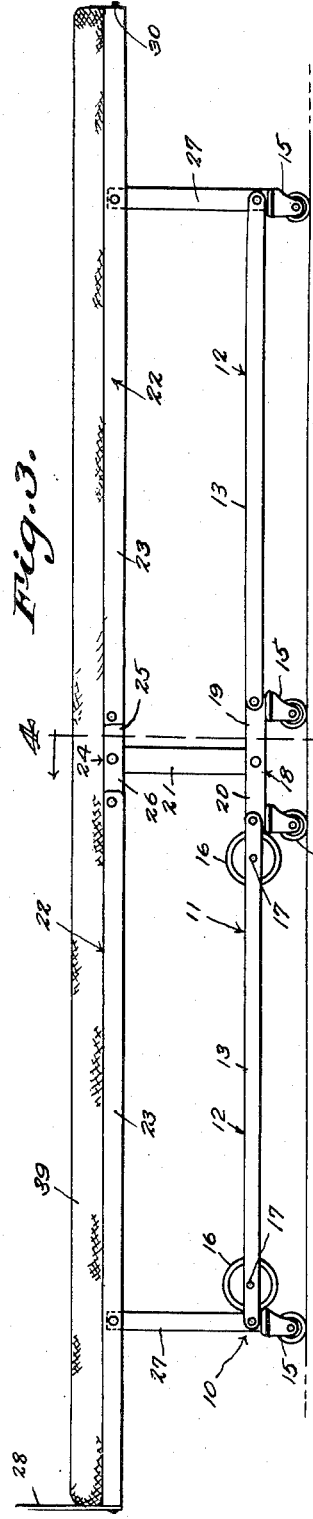
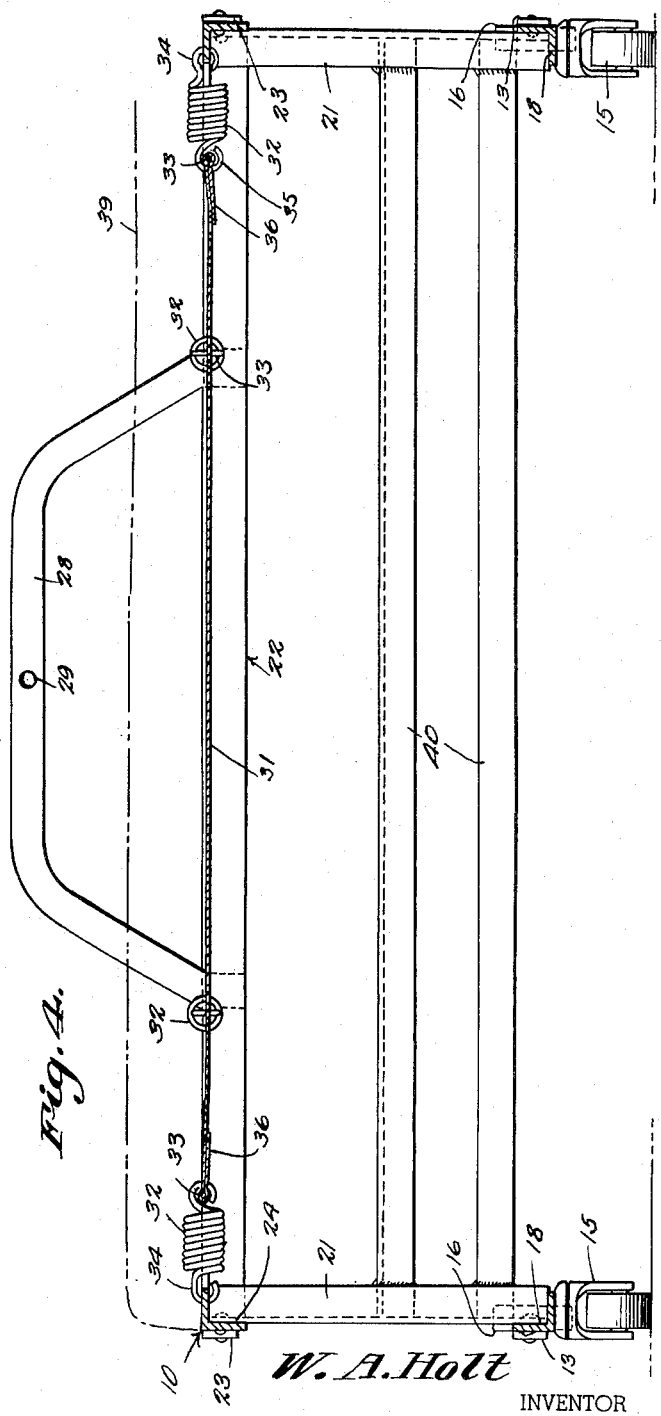
W. A. Holt
INVENTOR
BY C. A. Snow & Co.
ATTORNEYS.

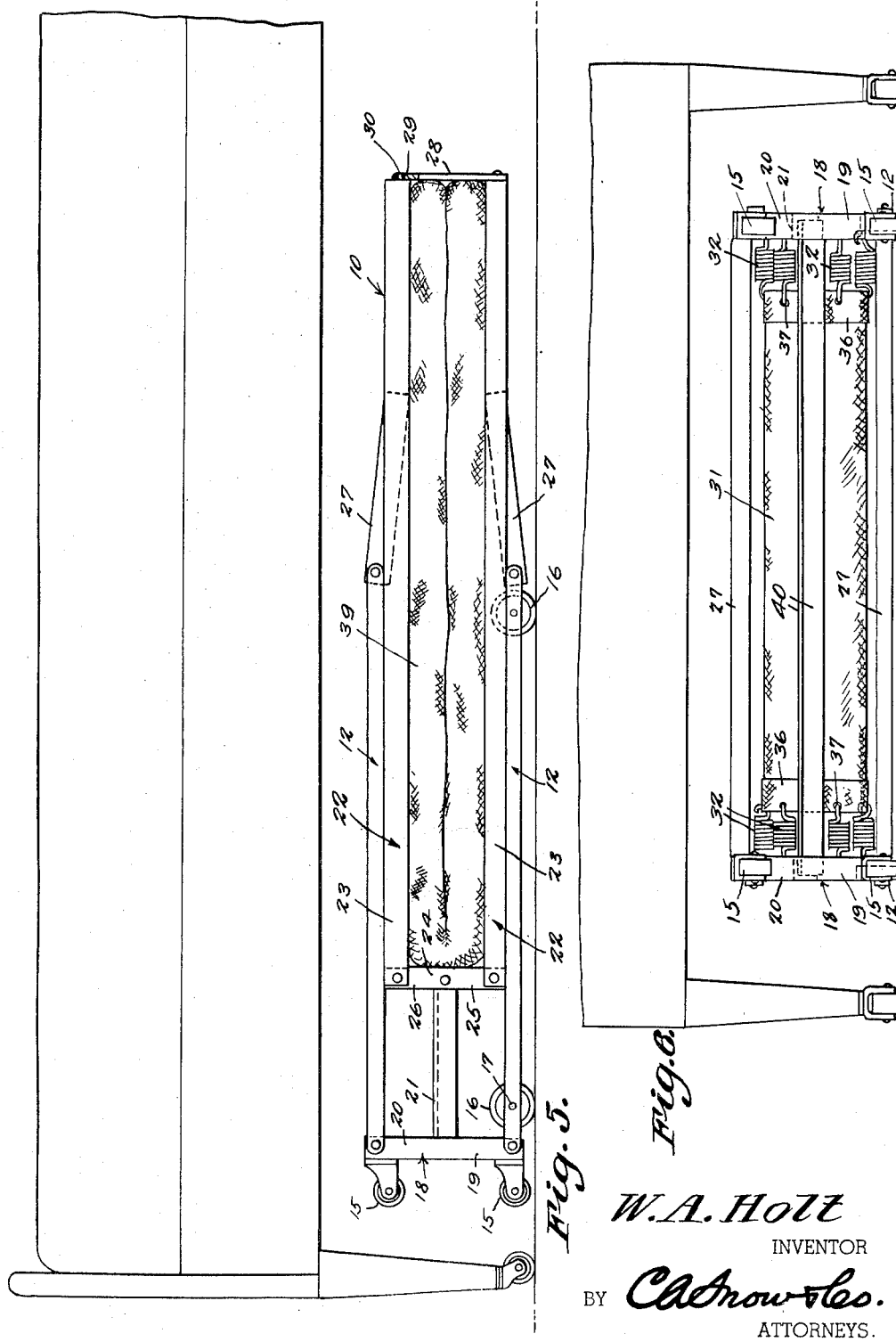

United States Patent Office 2,773,269
Patented Dec. 11, 1956

2,773,269

ROLL-A-WAY BED

William A. Holt, Mebane, N. C.

Application January 26, 1954, Serial No. 406,109

1 Claim. (Cl. 5—152)

This invention relates to a wheeled bed or cot which may be folded to be rolled away from a useful and operative position or open unfolded condition as a bed or cot to a location where it may be stored or concealed in its fully folded condition.

It is another object of this invention to provide a roll-a-way bed of the kind to be more particularly described hereinafter which may be folded from an extended position as a bed to a contracted folded position requiring much less space to store the bed than a conventional present day roll-a-way bed or cot. The bed in its extended open position may be readily stored or concealed under an average setup bed and when folded may be stored in a closet or other confined space as in an automobile trunk.

It is a still further object of this invention to provide a roll-a-way bed of this kind which may be easily rolled about in its extended or folded condition.

It is yet another object of this invention to provide a roll-a-way bed of this kind which is strong and durable while being light in weight and of a simple and clean design having no automatic gadgets to help in opening or closing the bed.

It is a still further object of this invention to provide a roll-a-way bed of this kind which is built for a thrifty shopper and a discriminate buyer.

It is yet a still further object of this invention to provide a roll-a-way bed of this kind having a trampoline type of bottom to thereby eliminate steel coiled springs to support a mattress.

Other and further objects and advantages of the invention will be hereinafter described and the novel features thereof defined in the appended claim.

In the drawings:

Fig. 1 is a side elevation of a roll-a-way bed constructed according to an embodiment of my invention being shown in its folded condition.

Fig. 2 is a bottom view of the bed shown in Fig. 1.

Fig. 3 is a side elevation of the roll-a-way bed in its extended condition.

Fig. 4 is a transverse section taken on the line 4—4 of Fig. 3.

Fig. 5 is a side elevation of my roll-a-way bed folded and rolled under a conventional stationary bed, the stationary bed being broken away.

Fig. 6 is an end elevation of my roll-a-way bed below a stationary bed.

Referring more specifically to the drawings the numeral 10 designates generally a roll-a-way bed constructed according to an embodiment of this invention.

The roll-a-way bed 10 is provided with a horizontally extending wheeled frame 11 formed in two parts to comprise two separately hingedly connected wheel frames 12 as clearly shown in the drawings.

Each of the wheel frames 12 is formed with a longitudinally extending side arm 13.

Casters 15 are secured to and rotatable on the under side of the wheel frames 12 adjacent to the outer ends thereof.

A pair of wheels 16 are rotatably secured along the length of one of the side arms 13 to be rotated on the floor of a supporting surface when the roll-a-way bed has been collapsed and placed on the floor in a folded position.

When the roll-a-way bed 10 is positioned in its folded condition, the rollers or casters 15 may properly rotatably engage the floor or supporting surface on which roll-a-way bed 10 is movably supported.

Each of the wheels 16 is provided with an axle 17 at the axis thereof so that the wheels 16 will be rotated about an axis transversely of the wheel frame 11.

The two above described wheel frames 12 are pivotally connected on the opposite ends of a horizontal lower link 18. The lower horizontal link 18 is provided with a horizontally extending arm 19 extending from one side thereof and a similar arm 20 extending horizontally from the other side thereof so that the arms 19 and 20 are in horizontal alignment for properly positioning the wheel frames 12 in the extended position of the roll-a-way bed 10.

The horizontal arms 19 and 20 are formed integral with or connected on the opposite sides of the vertically extending link 21.

Each of the horizontal bed frames 22 is provided with a pair of horizontal side bed frame bars 23 each of which is pivotally connected at one end thereof to the outer end of the upper horizontal link 24. The upper horizontal link 24 is provided with outwardly extending arms 25 and 26 on the opposite sides thereof and spaced vertically above the horizontally disposed arms 19 and 20 described above.

The vertical link 21 then supports the upper horizontal bed frame spaced upwardly above the lower horizontal wheel frames on each side of the vertical link 21.

At the outer end of each of the horizontally extending bed frame bars 23 there is provided a depending vertically extending link 27 with the vertically extending link 27 pivoted at its upper end to the bed frame 23 and at its lower end to the wheel frames immediately below the bed frame.

Casters 15 are also supported on the lower side of the horizontally extending bars 18 and 19 for engagement with the floor or other supporting surface as clearly shown in Fig. 1 of the drawings.

The roll-a-way bed may be extended from its folded position as shown in Fig. 1 of the drawings to an extended position clearly shown in Figs. 3 and 4 of the drawings.

A catch 28 is secured to one end of one of the horizontal bed frames 22, the catch 28 being provided with a hole 29 therethrough for receiving a pin 30 carried by the other of the bed frames 22 to secure the two bed frames together while the roll-a-way bed is then supported on the casters 15 carried by the horizontal arms 18 and 19 described above. In this condition of the roll-a-way bed the roll-a-way bed may be moved in a vertical position about the supporting surface into a closet or a similar confined space.

A sheet or mat 31 is carried by both of the bed frames 22 to extend entirely thereover.

A plurality of coil springs 32 are carried by the sheet or mat 31 to be hookingly engaged with the horizontal and transverse frame bars of the bed frame 22.

A wire 33 is carried by the sheet or mat 31 about the periphery thereof in order to properly stiffen the sheet or mat.

A hook 34 on one end of the coil spring 32 is to be engaged in a hole 38 in one of the side frame bars of the bed frame while a hook or eye 35 on the other end of the coil spring 32 is adapted to be engaged through a hole 37 through the hem 36 which is formed about the periphery of the sheet or mat 31.

The sheet or mat 31 is adapted to support a foam rubber mattress or the like on the roll-a-way bed and the mattress must be distortable along its length and still provide for the proper support of a body of a person on the bed.

The sheet or mat 31 is supported on the bed in the manner of a trampoline so that any further supporting springs, as vertical coiled springs, is eliminated.

Braces or brace bars 40 are provided transversely of the roll-a-way bed 10 for connection between the vertical links of the bed.

In the folded condition of the roll-a-way bed or cot the folded bed 10 is positioned in a flat folded condition with the wheels 16 rollably engaging on a floor while the bed 10 is rolled between the supporting legs of and below the spring and mattress of a conventional stationary framed bed as clearly shown in Figs. 5 and 6 of the drawings.

While the specific details of one embodiment of this invention have been herein shown and described, the invention is not confined thereto as changes and alterations may be made without departing from the spirit and scope thereof as defined in the appended claim.

I claim:

A folding bed comprising a pair of upper frame members, a pair of upper horizontal stationary bars disposed between the inner ends of said members, means pivotally securing said frame members to the ends of said upper bars, a pair of vertical bars fixed one to each of said upper horizontal bars, a lower horizontal bar fixed to the lower end of each vertical bar, casters secured to the outer ends of each lower bar, a pair of oppositely extending links pivotally connected at their inner ends to the outer ends of each lower bar, a pair of vertical outer end bars, a connecting bar fixed between each pair of said end bars, means pivotally securing the outer ends of said links to the lower ends of said outer end bars, a caster at the lower end of each outer end bar, means pivotally securing the upper ends of said outer end bars to said frame members, a pair of wheels rotatably carried by one pair of links, a common flexible sheet for said frame members, a wire fixed in the marginal edges of said sheet, a plurality of suspension springs secured between said frame members and said sheet, a substantially U-shaped latch bar fixed to the outer end of one frame member and formed with a keeper opening, and a latching pin carried by the outer end of the other frame member engageable with said keeper for holding said frame members in folded position.

References Cited in the file of this patent
UNITED STATES PATENTS

| | | |
|---|---|---|
| 968,564 | Hubbard | Aug. 30, 1910 |
| 1,110,812 | Meadoff | Sept. 15, 1914 |
| 1,135,022 | Hummel | Apr. 13, 1915 |
| 1,238,441 | Russell | Aug. 28, 1917 |
| 1,474,200 | McKellar | Nov. 13, 1923 |
| 1,927,109 | Abrams | Sept. 19, 1933 |

FOREIGN PATENTS

| | | |
|---|---|---|
| 371,773 | France | Feb. 1, 1907 |